Jan. 28, 1958     J. G. BAKER     2,821,113
WIDE ANGLE PHOTOGRAPHIC OBJECTIVE
Filed March 18, 1957
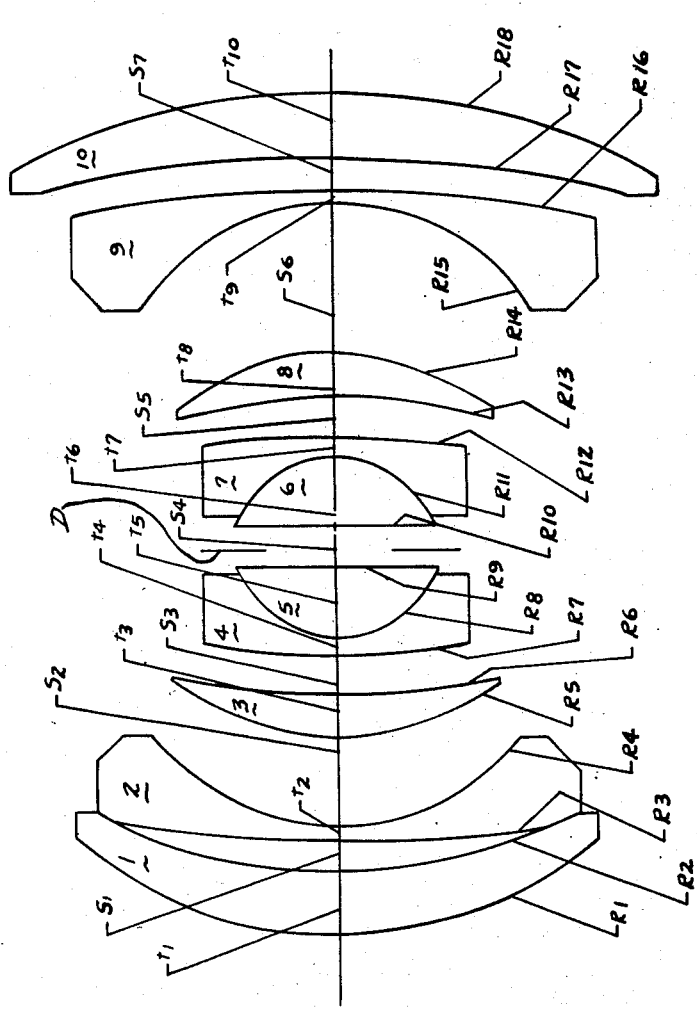
INVENTOR.
JAMES G. BAKER

United States Patent Office 2,821,113
Patented Jan. 28, 1958

2,821,113

WIDE ANGLE PHOTOGRAPHIC OBJECTIVE

James G. Baker, Winchester, Mass., assignor to the United States of America as represented by the Secretary of the Air Force Application March 18, 1957, Serial No. 646,944

5 Claims. (Cl. 88—57)

This invention relates to photographic objectives for aerial photography, and more particularly, to photographic objectives which are intended to cover a wide angle field of view.

The photographic objective comprising this invention is related to the class of the 4-element Gauss type objective in that its outermost element on either side is a positive meniscus curved around the central stop and the adjacent internal element on either side is a negative element also curved around the central stop. These Gauss type objectives have the advantage of being relatively compact and light, but the illumination over its somewhat limited field of view is not uniform. To overcome this, the inverted telephoto class of objectives has been designed. These objectives achieve a high degree of uniformity of illumination and a substantial correction of distortions at the expense, however, of great size and weight.

The photographic objective of this invention combines the favorable features of both classes without at the same time introducing any important disadvantages. For a given focal length, it is intermediate in size, between the small and compact 4-element type of wide angle lens of the Gauss class, and the physically very large objectives of the inverted telephoto class, and it is characterized by an improved uniformity of illumination over the angular field covered, as compared with the older 4-element Gaussian objective. In fact, it closely achieves the uniformity of illumination produced by the massive wide angle objectives of the inverted telephoto type. In addition, it provides a high degree of correction over a total field of view of 94° on a flat image plane, the maximum error not exceeding 12 seconds of arc in object space from the ideal distortion free grid.

The very considerable excursion of rays at different angles through a wide angle objective normally creates a rather difficult optical design problem in that the surface by surface refractions can vary greatly in strength over the field. This circumstance can be alleviated either by using very shallow lens curvatures, and, therefore, a very large objective, or by compressing the cross section of the transmitted bundle of light, surface by surface, so as to minimize the aberrations in this way. The type of objective comprising this invention uses both devices. It is also apparent from design considerations, that if a wide angle objective is to succeed, it must have its strongest surface curvatures more or less concentric around either the real stop or the image thereof in the particular intermediate image space. Only in this way can the variations over the field be kept under control.

In the recently developed inverted telephoto objective, the chief ray refraction surface by surface is minimized. This permits the spherical aberration of the chief ray to be held to a minimum, a circumstance favorable for obtaining low distortion in a natural way. This has been done in another way in this invention. It involves employing compensating refractions of the chief ray, as would be realized in the simultaneous solution of equations of condition for reducing the internal slope of the chief ray without increase in chief ray aberrations. This procedure has the disadvantage that the objective is more sensitive to distortion introduced by errors in fabrication. On the other hand, from a design point of view, conditions of minimum refraction can be departed from, provided the spherical aberration of the chief ray is corrected by opposing larger refractions. It is important that these refractions do not get too large, however, inasmuch as over a wide field of view, the zonal terms would become unacceptable. The very symmetry of a wide angle system, required by opposing refractions on either side of the central stop, can be drawn upon to a higher order by opposed refractions on the same side of the central stop, both before and after. The result is that this photographic objective produces a very low distortion for its moderate physical size.

The inverted telephoto form of wide angle objective achieves its improved uniformity of illumination by the following means. The chief ray in object space coming toward the entrance pupil at a designated field angle is initially refracted to a more moderate slope angle with respect to the optical axis on its transmission through the system, and emerges in final space refracted once again at practically its initial slope angle. In this way internally within the lens system the field angle is much more moderate and the refractions, surface by surface, therefore kept under control. In this invention, the same effect is achieved by employing a more violent refraction of the chief ray at the second element of the system, to reduce the internal slope angle and to achieve the same reduction in aberrations surface by surface. The more moderate slope angles so obtained in both classes of objectives causes the improvement in uniformity of illumination, inasmuch as the slope angle in the central air space is kept under better control than for the older Gauss form of wide angle objective. In other words, the inverted telephoto type of wide angle system employs chief ray refractions in the outer field at minimum deviation element by element or by groups of elements, whereas in this invention, considerable departures from minimum deviation have been permitted, although compensated by opposing refractions.

Any wide angle system that produces a flat image field must have a quite low Petzval sum. It must also be assumed in advance that astigmatism of several orders of approximation must be held to a very small magnitude if the image quality is to be preserved. Accordingly, a wide angle system must have within it somewhere strong negative curvatures to produce this reduction in the Petzval sum. Because of the need for wide angle systems to be symmetrical, it is generally found that these negative curvatures occur in pairs, symmetrical on either side of the central stop. If the aberrations of the system are to be kept low, it is necessary that these strong negative surfaces be of low relative height, or at least that the relative height of a paraxial pencil at such a negative surface must be low with respect to the largest relative heights at positive surfaces of the system. Thus, in the older Gauss form of objective representing the prior art, it is found that the relative height at the strong negative surfaces in such systems is of the order of 0.7 to 0.5 of the height unity in the entrance pupil. In the inverted telephoto objective, this relative height at the stop, adjacent to the dominant positive refracting groups is of the order of 1.2 to 1.5 times the height unity in the entrance pupil. Furthermore, the initial relative height of unity in the entrance pupil is also approximately the relative height at the dominant negative curvatures, but this circumstance is easily overcome by the height at the positive refractions which is greatly in excess of unity. The ratio of relative heights of negative to positive remains, therefore, of the order of 0.7 to 0.5, for this and the Gauss form of objective. In the subject invention the ratio of relative heights between the dominant negative curvatures and the dominant positive curvatures has been reduced, a circumstance that would lead to steeper curvatures for a given focal length and therefore to enhanced aberrations, if it were not for the use of high index glasses. The high index glass makes up for the shallow curvature, or conversely, if a high index is employed, the associated curvature can be reduced. The relationship of the high index to the physical size is substantially direct. If the average index of glass through the system were to be reduced, the system would become more compact and therefore of smaller physical size, but it would be necessary to reduce the clear aperture of the entrance pupil to achieve a particular quality of image correction. The distortion correction, however, would not be materially affected.

If all of the negative spherical aberrations of such a system were to be obtained from the dominant negative curvatures, these surfaces could not be closely concentric around the image of the stop D, and therefore strong refractions would appear in the outer rays of the aperture far off-axis. Although the symmetry of the wide angle system would eliminate the coma that otherwise would result, enhanced oblique spherical aberration in both the meridional and skew directions would appear. Therefore, if the spherical aberration obtained from the negative surfaces can be subdivided, such as by adding more elements, or obtained from some other part of the system, a net improvement may be realized. In the inverted telephoto objectives, as many as two or even three negative elements have been employed on either side of the central stop to achieve such a purpose. In addition, a nearly concentric cemented curve contributing negative spherical aberration is employed on both sides of the central stop D in the central group of elements. Normally a cemented surface introduces a substantial amount of overcorrected high order spherical aberration, and also chromatic spherical aberration. These can be kept under control by giving such surfaces only a moderate amount of work to do, and by choosing glass types to minimize the burden on these surfaces. The employment of both devices in this invention resulted in performance spherically over most of the field either within or nearly within one or two Rayleigh limits, according to the field angle, aperture and color. Where a relatively high index of refraction is employed for the element providing the dominant negative curvatures, the overcorrection in the outer field can be somewhat reduced. In this way the oblique spherical aberration in the skew direction can be reduced. Also, if such negative surfaces are caused to depart appreciably from the spherical form, in the direction of elliptical, parabolic, or even hyperbolic aspheric figuring, alleviation of the normal overcorrection of the oblique spherical aberration in the skew direction can be obtained. Strong aspheric surfaces are more expensive and more difficult to fabricate, but they offer some advantages if departures from the sphere can be held at least to conic sections. Therefore hyperboloidal negative surfaces may be considered where mandatory improvement in the outer field of such a wide angle system is to be achieved. Introduction of aspheric departures in the form of conic sections for the dominant negative curvatures immediately affects the primary astigmatism. Consequently conics as extreme as paraboloids or hyperboloids, while very useful, require extensive redistribution of corrections within the system, but do not change the basic order or nature of the refractions.

The principal object of this invention is to provide a moderate sized wide angle photographic objective substantially free from distortion over a total field of view of 94° on a flat image plate.

A further object of this invention is to provide a moderate sized wide angle photographic objective characterized by improved uniformity of illumination over the angular field covered.

These and other objects will become more apparent from the following description of the invention taken in connection with the accompanying drawing which shows a schematic view of the type of optical system designed for the above described purposes.

As seen in the figure of the drawing, the lens system is substantially symmetrical and consists essentially of four components on either side of the central stop, and which in the example shown comprises 10 elements. It is evident, however, that this system may have more elements depending on the severity of the conditions imposed. Outside elements 1 and 10 are positive menisci and are used to keep the relative height through the system at a moderate magnitude. Thely also help preserve the symmetry of the system. Moreover, the compression in the cross section of the transmitted bundle of light achieved by the initial positive refraction helps in reducing the spherical aberration internally within the system, surface by surface. The initial positive meniscus element can also be used in such a way as to enhance the refraction of the chief ray at the second element, resulting in a smaller slope angle of the chief ray internally within the system. By a proper choice of optical power of this initial positive meniscus, this inward refraction of the chief rays can be obtained without imposing a severe penalty on the aberrations of higher order in the aperture in the outermost part of the field. In fact, the refraction at the third surface of the system approximates the aplanatic condition, a circumstance favorable to the overall correction, and one that permits considerable departures from minimum deviation without incurring the risk of uncontrollable aberrations.

If the optical power of the first element is too strong, the aberrations at the second element are unacceptable. If the first element is optically too weak, the physical size of the system increases objectionably for the same performance. The power of the first element can best be described in terms of its dioptric power, the thickness being neglected. Calculations show that the power of this first element must lie in the range 0.20 to 0.40 of the power of the entire system. The index of refraction of the first element is of lesser importance, being permitted to cover a wide range from 1.5 to 1.7 without any very great harm to the performance. In general, the higher the index the better, but the rate of variation is small.

In the case of the second element the lens must always be a negative meniscus, the surface on the side of the long conjugate being very weakly convex. Calculations show that the absolute or numerical value of the radius of curvature of this air surface on the long conjugate side must be no shorter than the absolute or numerical value of the focal length of the system, nor longer than three times the focal length of the system. If the radius is too long, the inward refraction of the chief rays gets out of control and the aberrations, particularly higher order negative astigmatism, cannot be compensated. If the radius is any shorter than the focal length, taken together with the negative dioptric strength of the element as a whole, the higher order oblique spherical aberration would become excessive.

Further calculations show that the thin lens dioptric strength of the second element, which is a negative meniscus element, must lie in the range from minus 1.5 to minus 2.5 in terms of the power of the system taken as unity. In the case of the second element, the index of refraction is of greater importance, the higher index being preferred. If a low index of refraction is used, the system must be larger in size, or else the oblique spherical aberration would become unacceptable. Accordingly, this invention requires the index of refraction of the second element to lie in the range from 1.56 to 1.75.

The spacing of the second air space of the system, lying between the strong meniscus negative second element and the strong meniscus positive third element is very critical. Design considerations require it to lie in the range from 0.08 to 0.14 of the focal length of the system. If this air space is larger than the above limits, the system becomes excessively large while if the air space is too small, the lens curvatures become steep and the clear aperture of the pupil becomes limited. The corresponding air space in the rear of the system on the short conjugate side, lying between the strong meniscus positive element and the strong meniscus negative element is also critical for a wide angle system used for a distant object plane. Design conditions show that it must lie in the range from 1.3 to 1.8 times the axial length of the air space in the front half of the system. If the designated ratio of air spaces lies outside the indicated range, correction of the distortion in the system becomes impossible.

In the case of the third element, which is curved around the central stop D, calculations require the index of refraction to be high, if the physical size of the system is to be moderate. Accordingly, the range of index of refraction of this third element should lie between 1.62 and 1.92. If an index lower than 1.62 is used, then for equivalent performance at the same lens speed, the overall length of the system would become close to that already given by the inverted telephoto class. The dioptric power of the third element with the thickness neglected and measured in terms of the power of the system as unity lies in the range 1.20 to 2.00. If the dioptric power is greater than 2, the astigmatism and curvature of field becomes excessive. If the dioptric power is less than 1.20, too great a burden is thrown on other positive surfaces in the system, resulting in increased aberrations. Furthermore, the convex surface of this third element on the long conjugate side is more or less curved around the image of the central stop D. Therefore, the increase in aberrations off-axis is only slight. A stronger lens in general would require greater curvature, and produce departures from symmetry, as would also too weak a lens. This third element is air spaced from the very central group for the purpose of diminishing the amount of glass and therefore the absorption of light in the system. It is also a simple element, the inner concave surface being used to control the higher order of astigmatism when combined with the following surface of the fourth element.

The construction of the cemented doublet that follows, being the fourth and fifth elements combined, or the fourth component of the system, is of considerable important to the overall performance. This doublet assists greatly in achromatizing the system and at the same time contributes approximately 40 percent of the negative spherical aberration of the system for the portion of the lens system in front of the central stop D. It is important also that the cemented surface be nearly concentric around the image of the top D formed by refraction through the surface on the long conjugate side adjacent to the stop D. Accordingly, the limitations on the radius of curvature are very severe. If the radius is too short, excessive overcorrection is caused thereby, and the clear aperture cannot be very great. If the radius is too long, it is impossible to keep the surface concentric and to obtain sufficient negative spherical aberration for correction of the system. Accordingly, calculations require the numerical value of the radius of curvature of this surface to lie in the range from 0.12 to 0.20 in terms of the numerical value of the focal length of the system. The radius is, therefore, of the order of one seventh of the focal length. The index difference across the cemented surfaces in the front and rear central components is critical. Calculations show that if this index difference is too small, the system must become undesirably large to prevent excessive overcorrected spherical aberration resulting from the steep curvature required to produce the necessary amount of negative spherical aberration. If this index difference is too large, the system loses power. To overcome this, the lens curves must be steeper and this in turn results in increased aberrations. The best compromise is an index difference lying in the range from 0.04 to 0.09.

It is also extremely important that the air surface adjacent to the central stop be of very weak optical power. If the numerical value of the axial radius of curvature of this surface is less than six times the numerical value of the focal length of the system, excessive negative higher order astigmatism occurs on the concave side and excessive higher order positive astigmatism occurs on the convex side. Accordingly, the numerical value of the radius of curvature of this surface must exceed six times the focal length of the system. This surface is preferably aspheric when residual distortions must be sharply reduced. The sagittal depth of such a surface at any given zone would be held to moderate limits to avoid the astigmatism of higher order distortions described above. The aspheric shape itself may take a variety of forms according to the glass types and general arrangement of the other elements. Therefore, it is possible only to describe it physically in terms of the maximum variation in depth permitted. Extensive calculations show that the depth of the aspheric at its maximum point, somewhere between the center and the edge of the clear aperture should be in the range from 0 for the fully plano case to a depth not exceeding one thousandth of the focal length. The clear aperture is defined as, that required to transmit all rays over the usable field rather than just the central bundle. Thus, if the focal length of the system is six inches, the depth of the aspheric shall not exceed .006 inch, and so forth.

The description of the elements in the rear half of the system symmetrical with their mates in the front half follows along very much these same lines. The ranges can be considered identical in terms of dioptric power, as can also the indices and curvatures or radii described above. The additional consideration however, is that the elements that are related in the front and rear groups do not necessarily have to be identical. Fairly wide departures are considered feasible if suitably compensated by air spacing, thicknesses, or other adjustments. For example, in the formula given below, some elements are precisely the same in front and rear groups, whereas others are slightly different. These differences can be described in a general way by requiring that the dioptric power of the corresponding meniscus elements in the front and rear groups shall not differ by more than 10 per cent plus or minus. This preserves the general symmetry of the system, while permitting the designer a certain freedom of action in obtaining correction without departing from the spirit of the invention.

With respect to the differences between the elements in the front and rear groups, calculations show that for a wide angle lens imaging distant objects onto a flat focal plane, a fairly close relationship between the adjacent radii of the next to last and the last elements must be maintained. The next to the last element is a strong negative meniscus, curved around the central stop and therefore away from the short conjugate, and the same limitations apply to the convex surface as have been described above for the mating element in the front half. Design considerations require that the adjacent concave radius of the last element must have a radius of curvature lying within a range of .7 to 1.4 times the radius of the convex surface of the next to last element, the radii being treated as numerical quantities. Thus, in the drawing the radius of the convex surface is minus 1.85. The radius of the adjacent concave surface is minus 1.734, which is in the ratio .935. If the last element, that is, the element on the short conjugate side, is more concave than indicated immediately above, the higher order astigmatism is of negative sign and becomes impossible to compensate adequately. If the rear element is less concave than indicated, the higher order astigmatism becomes of undercorrected sign and is unacceptably large, while at the same time, the higher order distortion becomes undercorrected. Accordingly, close limits on the meniscus form of the rear with respect to the adjacent negative element must be preserved. In every other way, the limitations on dioptric power and index of refraction for the rear element become the same as those for the corresponding front elements in the front half of the system.

All of the other element thicknesses and air spaces are of secondary importance in the performance of the system. Therefore, the limitations placed upon these secondary thicknesses arise from natural design causes. The chief considerations are that the thicknesses must be finite and large enough to accommodate a finite edge thickness for the positive elements, and there must be no interference between adjacent elements nearly in contact. For example, the central thicknesses can be increased in positive meniscus elements 3 and 8, but at the expense of increased light absorption in the system. Also the thickness cannot be increased any further than when contact is made with the adjacent convex surfaces of the central doublets.

If aspheric figuring is not employed in this this lens system, the maximum distortion error will not exceed 10 seconds of arc in object space from the ideal distortion free grid. This is quite satisfactory for most uses. If more severe conditions are imposed, aspheric figuring may be applied as described above to the second and ninth elements to substantially eliminate residual distortion. Thus, for example, ellipsoidal figuring might be employed to relieve the tendency in the outer field for overcorrected oblique spherical aberration in skew direction. The figuring could be carried through the paraboloidal stage into strong hyperboloids for the same purpose. It is theoretically possible to obtain, in this way, considerable reduction in the oblique spherical aberration in the skew direction, while preserving other favorable characteristics of the system. When such aspheric figuring is added, however, it becomes necessary to adjust the higher order astigmatism by judicious bending of the rear element of the system. The exact meniscus form of the rear element determines the degree of over or undercorrection of the higher order astigmatism. Moreover, some control of this aberration can readily be obtained by slight deformations on the air surfaces adjacent to the central stop. The use of conic sections for these strong concave surfaces facilitates manufacture and testing, which for a mapping lens would be necessary to preserve the precision in the refraction of the chief rays. Otherwise, zonal distortion may result. It is important to remember that if strong aspherics in the form of paraboloids or hyperboloids are used, a redistribution of surface corrections by extensive recalculation will be necessary before adequate improvement can be obtained.

If the figuring were confined to the rear half of the system alone, the residual distortion could be removed, but a slight amount of coma would be introduced in the outermost part of the field. The symmetrical type of figuring eliminates this. In this way, the distortion over a 94° total field of view can be reduced everywhere to residuals not exceeding 5 seconds of arc with respect to the ideal mathematical grid. This aspheric figuring may also be added to the outermost positive meniscus elements, or may be distributed among the four surfaces on either side in the outermost elements. There is no advantage in applying aspheric figuring to the central group other than as described for the surfaces adjacent to the stop D.

In a possible variation of the invention, the central cemented doublets could be converted into cemented triplets. The nearly hemispherical elements adjacent to the central stop D would become compounded further with weak positive menisci, one on either side of the stop D, of approximately the same index of refraction, but with appreciably different dispersions. Thus, in the drawing, the $v$-value of the nearly hemispherical fifth element is of the order of 60 plus or minus 5 while with the weak positive nearly plano convex element cemented to the cemented doublet in this variation, the cemented triplet would have the same mean index of refraction, but the $v$-value would be of the order of 36 plus or minus 5. This makes it possible to achromatize the higher order astigmatism in the outermost part of the field and to reduce this chromatic tendency to negligible proportions.

The drawing shows a cross-sectional view of the lens. The long conjugate is on the left at a great distance, and the short conjugate is shown on the right as the focal plane. The light is considered to travel from left to right through the system. The lens formula for a typical example is as follows:

Lens Formula
$$[F=1.000 \quad f/5.6]$$

| Lens | Radii | Thicknesses | $n_D$ | $v$ | Type |
|---|---|---|---|---|---|
| I | $R_1 = 0.524$ | $t_1 = 0.0817$ | 1.617 | 36.6 | 617366 |
|   | $R_2 = 0.698$ | $S_1 = 0.0440$ |   |   |   |
| II | $R_3 = 1.850$ | $t_2 = 0.0157$ | 1.700 | 41.0 | 700410 |
|   | $R_4 = 0.305$ | $S_2 = 0.1163$ |   |   |   |
| III | $R_5 = 0.364$ | $t_3 = 0.0566$ | 1.8804 | 41.1 | 880411 |
|   | $R_6 = 1.083$ | $S_3 = 0.0497$ |   |   |   |
| IV | $R_7 = 1.422$ | $t_4 = 0.0251$ | 1.670 | 47.4 | 670474 |
| V | $R_8 = 0.143$ | $t_5 = 0.0871$ | 1.607 | 59.5 | 607595 |
|   | Vertex radius $R_9 = 6 \times F$*** | $S_4 = 0.0503$* |   |   |   |
| VI | Vertex radius $R_{10} = 6 \times F$*** | $t_6 = 0.0871$ | 1.607 | 59.5 | 607595 |
| VII | $R_{11} = -0.143$ | $t_7 = 0.0251$ | 1.670 | 47.4 | 670474 |
|   | $R_{12} = -1.422$ | $S_5 = 0.0497$ |   |   |   |
| VIII | $R_{13} = -0.877$ | $t_8 = 0.0566$ | 1.8804 | 41.1 | 880411 |
|   | $R_{14} = -0.338$ | $S_6 = 0.1951$ |   |   |   |
| IX | $R_{15} = -0.305$ | $t_9 = 0.0157$ | 1.700 | 41.0 | 700410 |
|   | $R_{16} = -1.850$ | $S_7\, 0.0440$ |   |   |   |
| X | $R_{17} = -1.734$ | $t_{10} = 0.0846$ | 1.617 | 36.6 | 575414 |
|   | $R_{18} = -0.936$ | $BF = 0.483$** |   |   |   |

\* The stop lies 0.0251 from the vertex of $R_9$ toward $R_{10}$.
\** The back focal distance.
\*** These surfaces are aspheric.

Where $R$ = radius, $t$ = thickness, $S$ = separation, $F$ = equivalent focal length of the system, $n_D$ = refractive index, $v$ = Abbé number, and Type = type of glass.

The above drawing and specification are to be considered as illustrative and not restrictive. The scope of this invention is to be governed by the limitations in the appended claims.

I claim:
1. A wide angle photographic objective made of glass components throughout comprising a substantially symmetrical lens system, said lens system comprising initial positive meniscus elements on the outside of the system, a second negative meniscus element, the initial positive meniscus element shaped to compensate the refraction of the chief ray at the second negative meniscus element for reducing the internal slope angle of the chief ray, said initial element having a dioptric power within .20 to .40 of the power of the entire system and having an index of refraction from 1.5 to 1.7, said second element comprising a negative meniscus and having a dioptric strength within minus 1.5 to minus 2.5 of the power of the entire system, and having an index of refraction between 1.56 and 1.75, a third element, said third element comprising a positive meniscus curved around the central stop and having a dioptric power with the thickness neglected within 1.20 to 2.00 of the power of the system and having an index of refraction between 1.62 to 1.92, the air space of the lens system lying between the strong negative meniscus comprising the second element and the positive meniscus comprising the third element lying between .08 to .14 of the numerical value of the focal length of the system, a corresponding air space in the rear of the system on the short conjugate side, said corresponding air space lying between 1.3 to 1.8 times the axial length of the air space in the front half of the system, a central group of lenses disposed on each side of a central stop for achromatizing the system and for contributing negative spherical aberration, the portion of said central group on each side of the central stop comprising at least two elements cemented together, said cemented surfaces substantially concentric around the image of the stop formed by the refraction of the chief ray at the respective air surfaces adjacent the central stop, the numerical value of the radius of curvature of the cemented surface of the central group of lenses in front of the central stop within .12 to .20 of the focal length of this system, the numerical value of the contact radius of curvature of the air surface adjacent the central stop greater than six times the focal length of the system, the index differences across the cemented surfaces within .04 to .09, the next to the last element in the rear group of lenses comprising a strong negative meniscus curved around the central stop, the adjacent concave surface of the last element within .7 to 1.4 times the numerical value of the radius of the adjacent convex surface of the next to the last element, the remaining elements in the rear half of the lens system within 10 percent of the specification of the values of the corresponding elements in the front half of the system.

2. The invention set forth in claim 1 including means for substantially eliminating residual distortion over a 94° field of view, said means including shaping predetermined elements of surfaces of a lens system aspherically.

3. The apparatus set forth in claim 2 wherein at least some of said aspheric surfaces are conic sections.

4. The apparatus set forth in claim 2 in which the air surface on either side of the central stop is aspheric, the sagittal depth of said aspheric surface at its maximum point not exceeding $1/1000$ of the focal length of the system.

5. A wide angle photographic objective having numerical data substantially as follows:

[F = 1.000   f/5.6]

| Lens | Radii | Thicknesses | $n_D$ | $v$ | Type |
|------|-------|-------------|-------|-----|------|
| I    | $R_1 = 0.524$ | $t_1 = 0.0817$ | 1.617 | 36.6 | 617366 |
|      | $R_2 = 0.698$ | $S_1 = 0.0440$ |  |  |  |
| II   | $R_3 = 1.850$ | $t_2 = 0.0157$ | 1.700 | 41.0 | 700410 |
|      | $R_4 = 0.305$ | $S_2 = 0.1163$ |  |  |  |
| III  | $R_5 = 0.364$ | $t_3 = 0.0566$ | 1.8804 | 41.1 | 880411 |
|      | $R_6 = 1.083$ | $S_3 = 0.0497$ |  |  |  |
| IV   | $R_7 = 1.422$ | $t_4 = 0.0251$ | 1.670 | 47.4 | 670474 |
|      | $R_8 = 0.143$ |  |  |  |  |
| V    | Vertex radius $R_9 = 6 \times F^{***}$ | $t_5 = 0.0871$ | 1.607 | 59.5 | 607595 |
|      |  | $S_4 = 0.0503^*$ |  |  |  |
| VI   | Vertex radius $R_{10} = 6 \times F^{***}$ | $t_6 = 0.0871$ | 1.607 | 59.5 | 607595 |
| VII  | $R_{11} = -0.143$ | $t_7 = 0.0251$ | 1.670 | 47.4 | 670474 |
|      | $R_{12} = -1.422$ | $S_5 = 0.0497$ |  |  |  |
| VIII | $R_{13} = -0.877$ | $t_8 = 0.0566$ | 1.8804 | 41.1 | 880411 |
|      | $R_{14} = -0.338$ | $S_6 = 0.1951$ |  |  |  |
| IX   | $R_{15} = -0.305$ | $t_9 = 0.0157$ | 1.700 | 41.0 | 700410 |
|      | $R_{16} = -1.850$ | $S_7 = 0.0440$ |  |  |  |
| X    | $R_{17} = -1.734$ | $t_{10} = 0.0846$ | 1.617 | 36.6 | 575414 |
|      | $R_{18} = -0.936$ | BF = 0.483** |  |  |  |

* The stop lies 0.0251 from the vertex of $R_9$ toward $R_{10}$.
** The back focal distance.
*** These surfaces are aspheric.

Where $R$ = radius, $t$ = thickness, $s$ = separation, $F$ = equivalent focal length of system, $n_D$ = refractive index, $v$ = Abbé number, and Type = type of glass.

References Cited in the file of this patent

UNITED STATES PATENTS

| | | |
|---|---|---|
| 1,955,590 | Lee | Apr. 17, 1934 |
| 2,031,792 | Richter | Feb. 25, 1936 |
| 2,100,290 | Lee | Nov. 23, 1937 |
| 2,247,068 | Richter | June 24, 1941 |
| 2,516,724 | Roossinov | July 25, 1950 |
| 2,713,809 | Cook | July 26, 1955 |
| 2,734,424 | Bertele | Feb. 14, 1956 |
| 2,781,695 | Klemt | Feb. 19, 1957 |

FOREIGN PATENTS

| | | |
|---|---|---|
| 720,808 | Great Britain | Dec. 29, 1954 |